United States Patent [19]
Ashley, Jr.

[11] 3,743,125
[45] July 3, 1973

[54] CAMPER BODY LIFT AND SUPPORT

[75] Inventor: Paul J. Ashley, Jr., Pico Rivera, Calif.

[73] Assignee: Bradshaw Incorporated, Montebello, Calif.

[22] Filed: May 21, 1971

[21] Appl. No.: 145,704

[52] U.S. Cl. .................................. 214/515, 254/49
[51] Int. Cl. .............................................. B60p 1/54
[58] Field of Search ...................... 214/515; 254/45, 254/49, 50

[56] References Cited
UNITED STATES PATENTS

| | | | |
|---|---|---|---|
| 3,251,494 | 5/1966 | Pulliam | 214/515 X |
| 2,983,394 | 5/1961 | McKee | 214/515 X |
| 3,148,795 | 9/1964 | Leach | 214/515 |
| 3,202,304 | 8/1965 | Lannen | 214/515 X |
| 3,186,570 | 6/1965 | Bunnell | 214/515 |
| 1,048,722 | 12/1912 | Morgan | 254/45 |

FOREIGN PATENTS OR APPLICATIONS

| | | | |
|---|---|---|---|
| 1,129,530 | 1/1957 | France | 214/515 |

*Primary Examiner*—Albert J. Makay
*Attorney*—Birch and Birch

[57] ABSTRACT

A camper body of the type adapted to be carried in a "pick-up" truck is provided with a pair of pivoted legs on each side. The lower ends of the legs on either side are pivoted to a longitudinal ground support member such as a channel member in the provision of a shoe. These ground support members or shoes provide a degree of stability which is not afforded by conventional jacks and make it possible to separate the camper body from the pick-up truck by simply moving the truck in reverse. A diagonal cable arrests the movements of the legs to positions of clearance between the camper body and the truck. To reload the camper body on the truck the truck is simply moved under the camper body and the two are coupled, such as by means of a cable, whereupon the truck is moved forwardly thereby reversing the process. When the camper body is resting on its ground support members removable lateral braces are also provided between the camper body of each ground support member to provide increased stability. Further increased stability is provided by a lateral cable which connecs the two ground support members or shoes and these ground support members are provided with tread means for anti-slip purposes.

16 Claims, 9 Drawing Figures

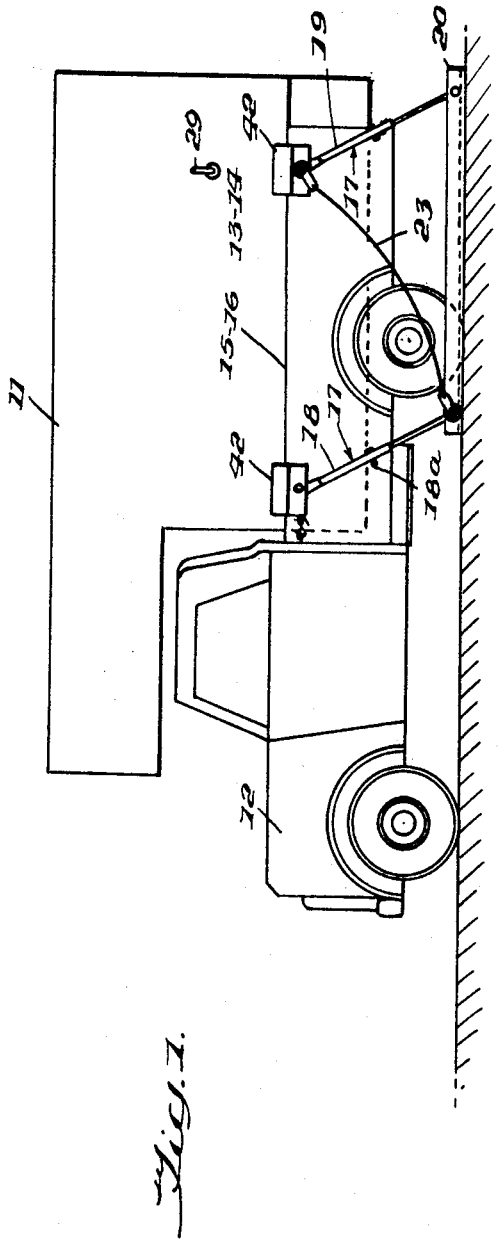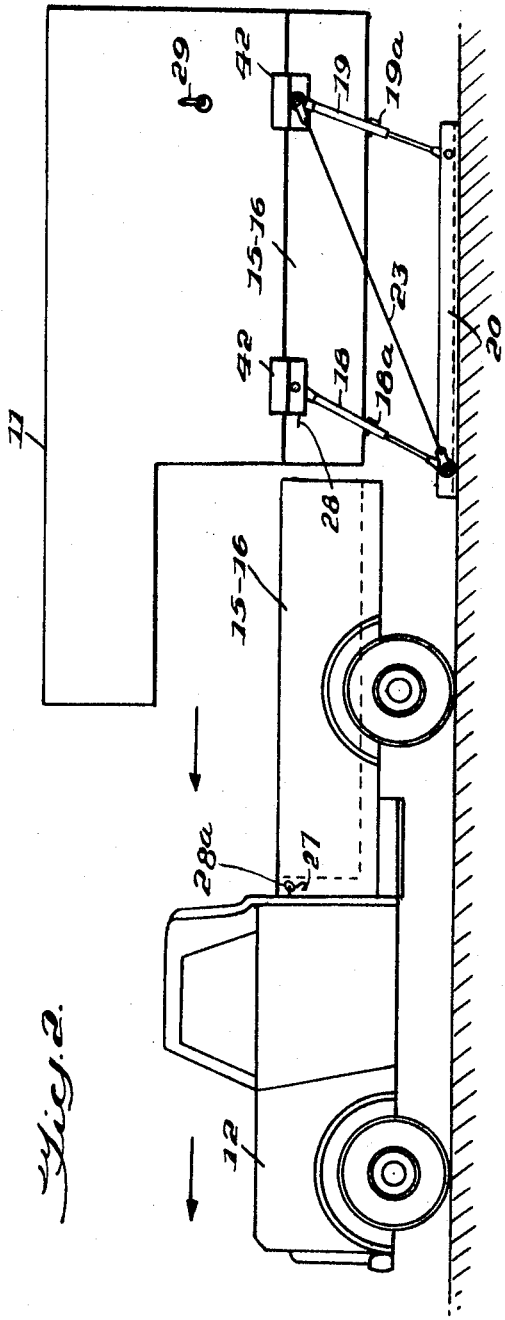

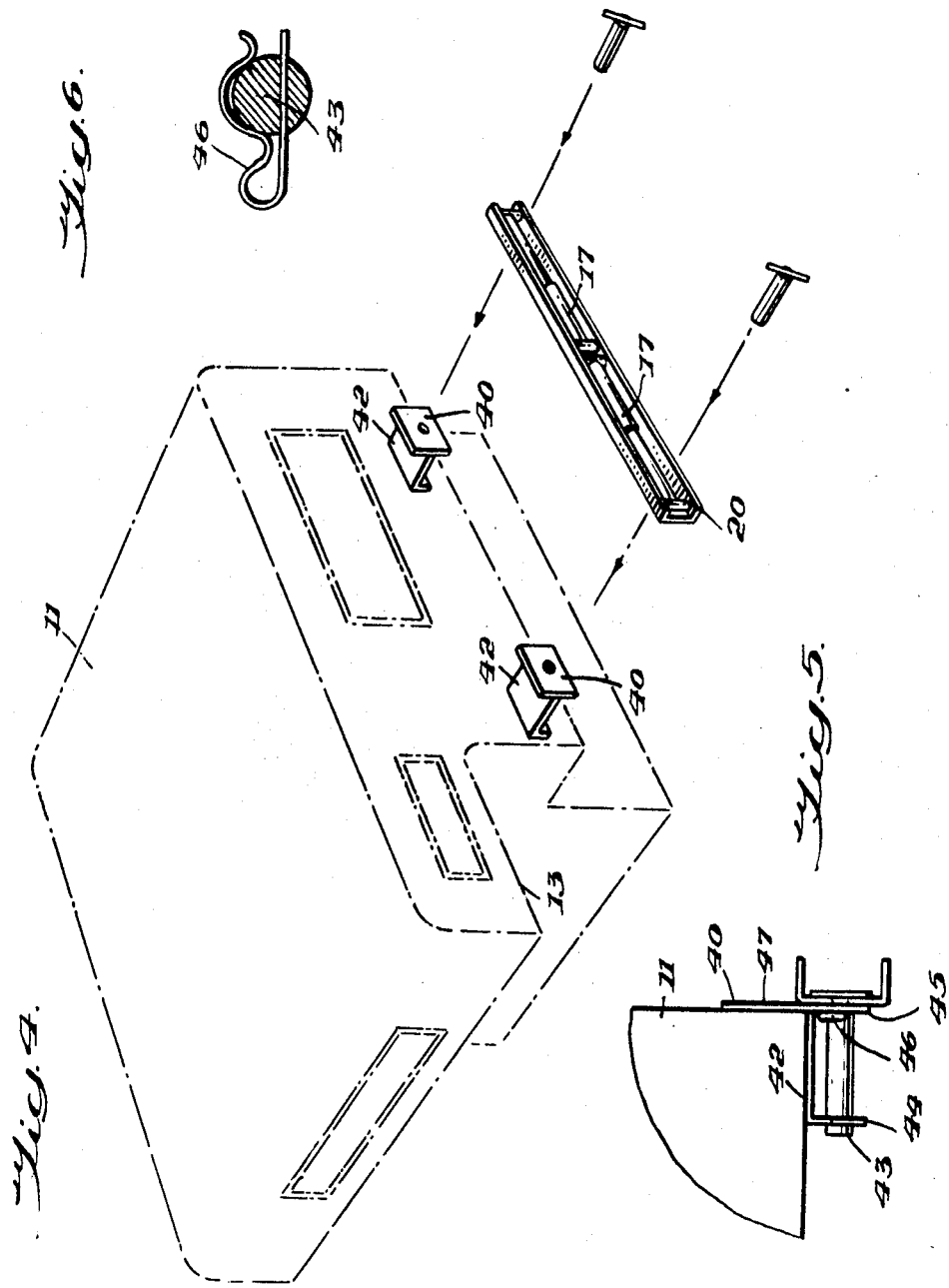

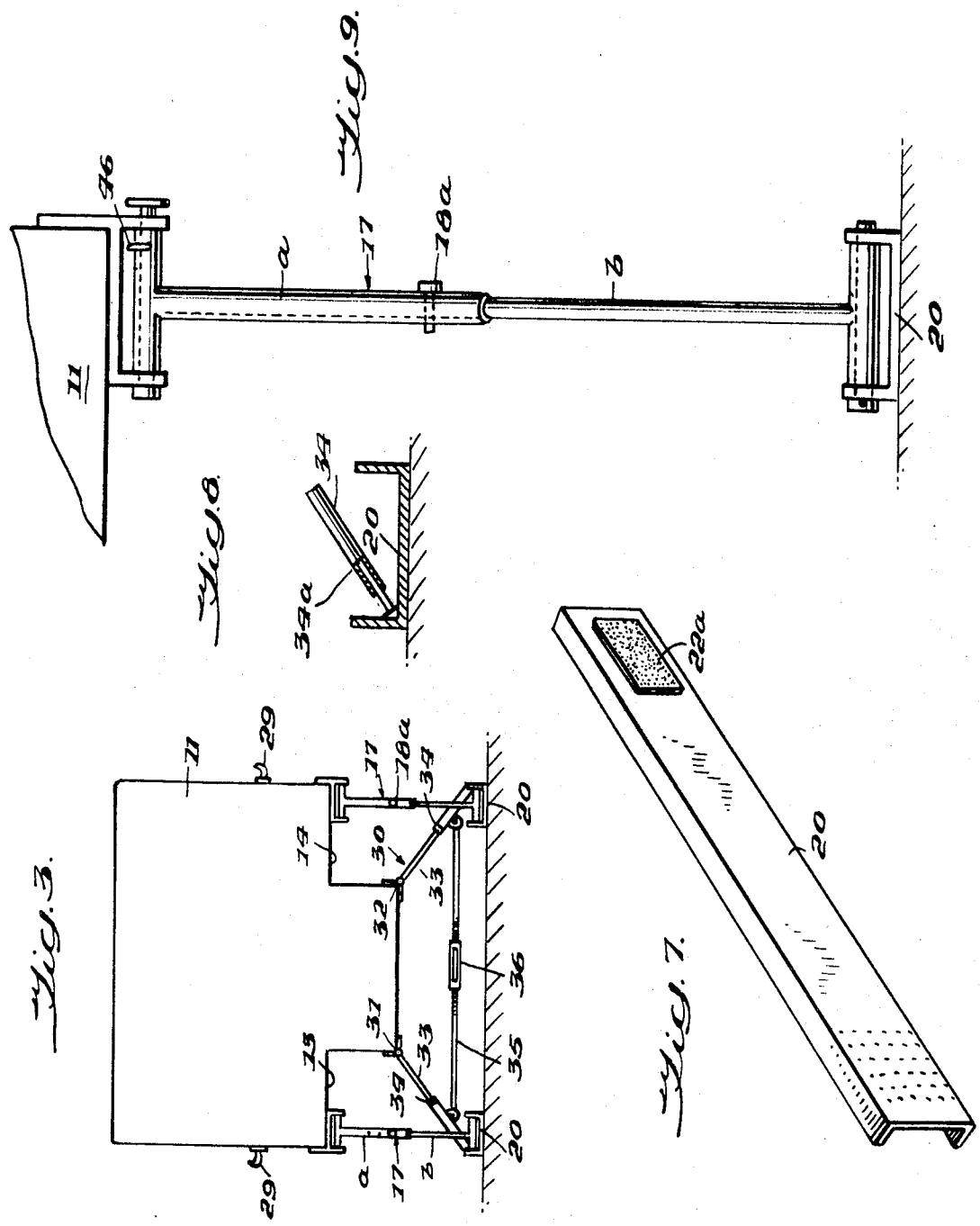

CAMPER BODY LIFT AND SUPPORT

This invention relates to campers and it is more particularly concerned with a camper having a camper body which is adapted to conformably rest on a so-called "pick-up" truck.

Campers of this type have, in recent years, gained wide popularity. One reason for such popularity is the fact that the camper body can be removed from the pick-up truck and each used independently of the other.

When it is desired to separate the camper body from the pick-up truck jacks are conventionally provided for this purpose. Such jacks provide for elevation of the camper body off the pick-up truck whereupon the truck is free of the camper body and can be used independently of it.

However, heretofore a camper body supported on such jacks is relatively precarious. The jacks are difficult to manage in order to maintain the camper body level especially in relatively soft soil or sand of the conventional camp sites where the jacks are prone to sink in the ground to different levels. The camper is uninhabitable, unless it is lowered to the ground for stability. For example, a 20 mph wind may blow it over when using conventional jacks.

It is the general object of this invention to provide novel means for elevating and lowering a camper body onto a pick-up truck, said means including elongated shoe means for maintaining ground engaging surface levels on soft sandy surfaces as well as hard ground surfaces.

A specific object of the invention is the provision of such camper body elevating and lowering means which can be operated by movement of the truck alone.

Another object of the invention is the provision of such means which is simple and convenient to operate and which does not require any special skill.

A further object is the provision of such means which can function to support the camper body at a site independent of the pick-up truck thereby releasing the truck for other uses.

Yet another object is the provision of a novel shoe with a non-skid surface for use on hard surfaces, such as concrete or the like.

Still another object is the provision of a novel camper lift having a novel storage arrangement for the lift when the camper is on the pick-up truck for road travel.

These and still further objects, features and advantages of the invention will appear more fully from the following description considered together with the accompanying drawing.

Prior devices of this general type are exemplified by the following patents: LEACH U.S. Pat. No. 3,148,795; GREEN U.S. Pat. No. 3,243,161; ROYAL U.S. Pat. No. 3,164,371.

The present invention differs from these prior patents in the fact that it provides longitudinal ground bearing elongated shoe members on either side of the camper body. These shoe members are linked to the camper body by pivoted legs to form with the camper body a parallelogram linkage which constrains the longitudinal bearing members to positions parallel to the camper body. In one position of the linkage the camper body rests on the pick-up truck. In another position, the camper body is elevated from the pick-up truck and is arrested by means of a diagonal cable in the linkage.

The linkage is moved from one position to another by simple backward and forward motion of the pick-up truck. In the rearward movement the front wall of the truck abuts the camper body and pushes it into the elevated postion. On the forward movement the truck and the camper body are connected together by means of short cable means at the front and rear of the camper body.

In the drawings:

FIG. 1 is a side elevational view of an embodiment of the invention mounted on a pick-up truck;

FIG. 2 is a side elevational view of the truck and camper body shown in FIG. 1 separated for individual use;

FIG. 3 is a rear elevational view of one form of lateral support brace, such as may be used when the camper is erected and separated from the truck;

FIG. 4 is a side perspective view of a camper with the camper lift pulled apart with the telescope legs retracted and pivoted flat in the shoe;

FIG. 5 is a section view taken on line A—A of FIG. 4 showing the shoe, hinge pin and bracket for the upper bearing of the telescope legs shown stored in the shoe;

FIG. 6 is a cross section view of the hinge pin to show the detail of a wire clip adapted to hold the pin in position in the bracket;

FIG. 7 is a perspective view of one of the channel or shoe members illustrating two embodiments of anti-skid features.

FIG. 8 is cross section view taken transversely of one of the shoes and shows the connection bolt for the lateral brace when the camper body is separated for parking; and FIG. 9 is an enlarged elevation view of one of the camper telescope legs in extended ground support position.

Referring to the drawings and first with particular reference to the embodiment illustrated in FIGS. 1 and 2 it comprises a conventional camper body 11 mounted on a conventional pick-up truck 12. Bottom walls 13 and 14 of the camper body rest on and extend outwardly beyond the side panels 15 and 16 of the truck.

On either side of the camper body there are pivotally suspended parallelogram linkages 17. Each linkage comprises legs 18 and 19 the upper ends of which are pivotally connected to the bottom walls 13 and 14 at the front and back, respectively of the camper body. Each leg is preferably formed in two sections a and b mounted to be extensible and retractable telescopically with respect to each other. These telescopic sections may be locked in any desired position by pins 18a and 19b insertable in suitably aligned openings through the respectively associated sections a and b. The lower ends of the legs 18 and 19 are pivotally connected to a longitudinal channel member 20 in the provision of a shoe. Each shoe member 20 is sufficiently long and wide to constitute ground bearing support for each side of the camper body in places of conventional sites, e.g., sand, camping grounds, and so forth. As shown in FIGS. 3 and 7 each bottom surface of each shoe 20 may be roughened to provide an anti-slip tread 22 or it may have a rubber tread means 22a for this purpose. In any position the shoe members 20 extend forwardly and rearwardly substantial distances relative to the center of gravity of the camper body, see FIG. 2.

The legs 18 and 19 are longer than the distance between the ground and the bottom walls 13 and 14 so that in a nearly vertical position they elevate and support the camper body 11 independently of the pick-up truck 12. Also, the legs are formed of telescoping sections adapted to be retracted for storage as in FIGS. 4 and 5.

A diagonal cable 23 is provided between the bottom of the forward leg 18 and the top of the rear leg 19 of sufficient length to arrest the pivotal movement of the camper lift linkage, when the camper body is elevated to the position shown in FIG. 2.

The device is used by placing the parts in the position shown in FIG. 1. The pick-up truck 12 is then driven rearwardly to the position shown in FIG. 2. The rear cab wall 24 of the truck abuts the front wall 25 of the camper body, thus pushing the camper body 11 rearwardly on the legs and elevating it. This frees the camper body from the truck, whereupon the truck may then be driven forwardly independent of the camper body, see FIG. 2.

To load the camper body on the truck, the truck is simply moved rearwardly under the camper body to the position shown in FIG. 2 and it is coupled to the camper body at the front wall thereof with a coupling member, such as a hook 28 by cable 26 connected with a coupling member, such as a hook 27 by coupling eyes or rings 28A, one on each end of the cable. The truck is then driven forwardly which moves the camper body relative to the camper lift legs to the rest position, shown in FIG. 1.

For road travel, the linkages are elevated against the bottom walls 13 and 14 and they are held in this elevated position by suitable means, such as hooks 29 on the side of the camper body which engage the cables 23, or the camper lift may be stored at the respective side walls of the camper as in FIGS. 4, 5 and 6.

For increased lateral support, adjustable length tubular braces 30 are disposed between corners of the camper body and the channels or shoes 20. The braces 30 at each upper end have saddles 31 and 32 which are carried by the upper ends of the adjustable braces 30. These saddles are formed to fit against the lower side edges defined by the bottom walls 13 and 14 and the reduced lower section of the camper body 11. Each saddle 31 and 32 is in the shape of an angle bracket and is carried by a post 33 which telescopes in a lower tubular section 34. This section slips over a bolt or pin 34a. This bolt or pin is suitably angularly secured to a side wall of the shoe channel 20, see FIG. 8. Post 33 may include an externally threaded portion and has a threaded abutment nut 37 threadable thereon for locking the extended length of the braces 30 in position. Hence, by rotating the abutment nut 37 on the post 33 the effective length of the brace sections may be changed to provide a snug fit of each saddle with the camper body.

Additional lateral support may be provided by a lateral cable 35 connected at either end to tubular sections 34 of tubular braces 30, and may be adjustable for tension by a turnbuckle 36.

The elongated ground engaging shoes 20 as described are formed from channel members and the interior of the same are pivoted to camper lift legs. These legs are made in the telescopic sections a and b with bearings at each exposed end, and the legs may be collapsed for storing within the channel side of the shoes 20, see FIGS. 4, 5 and 6, or which may be extended to their respective predetermined full length when used to provide a lift to the camper body as in FIGS. 2 and 8. The top section of the respective legs are each pivoted from hinge pins on the underportion of each of the overhang sides of the camper body, see FIGS. 5 and 6, and when the legs are extended and moved to upright position with respect to the center of gravity of the camper body and to a ground surface they provide lift to the camper body 11 to raise it from the "pick-up" truck body.

In one form of the lift arrangement, provision is made for storage of the camper lift, as shown in FIG. 4. This is of particular advantage for storing the shoes and legs of the camper lift when the "pick-up" truck and the camper body are together for road trips. With particular reference to this storage feature, there is shown in section view on line A—A of FIG. 4, bracket plates 40 at the sides of the camper body 11. The bracket plates extend downwardly below the offset edge of the camper body side and preferably are parts of a bracket 42 secured to the lower offset underside of the camper body 11. This bracket 42 has legs 44 and 45 and is formed as an inverted U-bracket with a hinge pin 43 mounted in aligned openings in the bracket legs 44 and 45 and are held in position by a wire clip 46 extending through an aperture in the pin, see FIG. 6.

Thus there are provided novel improvements in a truck carried camper body, whereby a camper lift and support combination is provided for the camper body for first lifting the camper body from the truck to separate the same from the supporting truck body on which it may rest for mobility and secondly after such first lifting operation of the camper body, the camper body lift members serve as fixed support members for the camper body independently of the truck on any suitable ground surface.

Without further description, it is believed that the foregoing amply describes the present novel arrangement and combination of parts which make up the structure of the present invention, and it is to be expressly understood that various changes now likely to occur to others, may be made without departing from the scope of this invention. Reference should be had to the appended claims to determine the scope of my invention.

What is claimed is:

1. The improvement in a camper body adapted to removably fit in a pick-up truck said improvement comprising parallelogram linkages connected to either side of the camper body and extending downwardly to ground level when the camper is on the pick-up truck, said linkages on either side of the camper body comprising a single elongated longitudinal ground engaging shoe member and front and rear legs pivotally connected at their lower ends to the ground shoe member and pivotally connected at their upper ends to the camper body to provide unitary structure, said legs of each unitary structure to each side of the camper body being longer than the vertical distance between their upper ends and ground level in the provision of a camper body lift with off center action of the said legs forwardly or rearwardly of the longitudinal axes of the truck and camper body, and a diagonal cable between the lower end of the front leg and the upper end of the rear leg to arrest the said off center action of the legs of the linkage in a given position of forward or rearward off center support for the camper body independently of the truck said improvement further including a lateral brace at each camper body corner, said brace comprising an elongated post, said post having an upper section mounted to each one of said camper body corners, and a lower section mounted to one of the corresponding ground engaging shoe members, said sections being formed to telescope together for manual adjustment, and means for locking said sections in adjusted positions.

2. The improvement defined by claim 1, in which the ground shoe members extend forwardly and rearwardly substantial distances from the center of gravity of the camper body.

3. The improvement as defined by claim 1, and means along the bottom of the ground engaging shoe member for increasing friction with the ground.

4. The improvement as defined by claim 1, in which the ground support member is in the shape of a longitudinal channel.

5. The improvement as defined by claim 3 in which the bottom of the channel has a plurality of dimples for increasing friction with the ground.

6. The improvement as defined in claim 3, in which the bottom of the channel is provided with an anti-slip surface.

7. The improvement as defined by claim 1, and means for releasibly holding the linkage in an elevated position for highway travel.

8. The improvement as defined by claim 1, and means for effecting co-movement of the truck and camper body in forward and rearward directions.

9. The improvement as defined by claim 1, and means for releasibly coupling the camper body to the pick-up truck for co-movement when the camper body is in an elevated position relative to the truck.

10. The improvement defined by claim 1, in which the ground engaging shoe members are demountable and attachable in demounted condition for storage along the sides of the camper body.

11. The improvement defined by claim 1, in which the legs are telescopically adjustable.

12. The improvement as described in claim 1, wherein
said elongated post is formed of tubular sections.

13. The improvement as described in claim 1, wherein said post has its upper section and said lower section formed with threaded portions normally threadable together intermediate the length of the post.

14. The improvement as described in claim 1, wherein each upper post section is secured by a body corner conforming saddle.

15. The improvement as described in claim 1, wherein said means for locking said sections in adjusted positions comprises a threaded abutment nut mounted at the juncture between said upper and lower sections.

16. The improvement as described in claim 1, wherein lateral cable means are connected between said lateral bracing means and having means thereon for adjusting the tension of said cable means.

* * * * *